(12) United States Patent
Wolfe

(10) Patent No.: US 9,254,791 B2
(45) Date of Patent: *Feb. 9, 2016

(54) BICYCLE RACK INSTALLABLE IN A PICKUP TRUCK BED OR TRAILER

(71) Applicant: Daniel Glen Wolfe, Highland, UT (US)

(72) Inventor: Daniel Glen Wolfe, Highland, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/704,347

(22) Filed: May 5, 2015

(65) Prior Publication Data

US 2015/0232041 A1 Aug. 20, 2015

Related U.S. Application Data

(63) Continuation-in-part of application No. 14/031,037, filed on Sep. 18, 2013, now Pat. No. 9,022,265.

(51) Int. Cl.
    *B60R 9/10* (2006.01)
    *B60P 3/077* (2006.01)
    *B60R 9/06* (2006.01)

(52) U.S. Cl.
    CPC . *B60R 9/10* (2013.01); *B60P 3/077* (2013.01); *B60R 9/06* (2013.01)

(58) Field of Classification Search
    CPC ............................................................ B60R 9/10
    USPC ......... 224/403, 405, 924, 402, 500, 523, 533, 224/536, 537, 324; 410/3; 211/19, 20, 22
    See application file for complete search history.

(56) References Cited

U.S. PATENT DOCUMENTS

| | | | | |
|---|---|---|---|---|
| 5,092,504 A | * | 3/1992 | Hannes et al. | 224/403 |
| 5,127,564 A | * | 7/1992 | Romero | 224/403 |
| 5,611,472 A | * | 3/1997 | Miller | 224/403 |
| 5,862,966 A | * | 1/1999 | Mehls | 224/504 |
| 5,988,403 A | * | 11/1999 | Robideau | 211/20 |
| 6,062,396 A | * | 5/2000 | Eason | 211/20 |
| 6,179,181 B1 | * | 1/2001 | Johnson et al. | 224/405 |
| 6,834,786 B2 | * | 12/2004 | Hansen | 224/403 |
| 6,968,986 B1 | * | 11/2005 | Lloyd et al. | 224/507 |
| 7,694,830 B1 | * | 4/2010 | Larson | 211/20 |
| 7,784,656 B2 | * | 8/2010 | Morrill et al. | 224/504 |
| 8,113,398 B2 | * | 2/2012 | Sautter et al. | 224/497 |
| 8,496,148 B2 | * | 7/2013 | Farney | 224/497 |
| 8,763,870 B2 | * | 7/2014 | Davis | 224/324 |
| 9,022,265 B2 | * | 5/2015 | Wolfe et al. | 224/403 |
| 2006/0196906 A1 | * | 9/2006 | Gibson, Jr. | 224/403 |
| 2013/0277404 A1 | * | 10/2013 | Heininger | 224/405 |
| 2014/0117062 A1 | * | 5/2014 | Kraeuter et al. | 224/403 |

* cited by examiner

*Primary Examiner* — Justin Larson
(74) *Attorney, Agent, or Firm* — Angus C. Fox, III

(57) ABSTRACT

An improved, simple rack for the secure transport of bicycles and small motorcycles in the bed of a pickup truck or trailer without clamping, strapping or disassembly of the cycle, and with minimal obstruction of the load-carrying bed floor, has individual cycle wheel receptacles with both fixed and spring-loaded wheel clamping brackets, that are secured to at least one rack rail assembly that is secured to opposite sides of the truck or trailer bed. In order to secure a cycle in the rack, a front or rear wheel of the cycle is lifted up and pushed into the wheel receptacle between the fixed and spring-loaded wheel clamping brackets. In order to unload the cycle, the wheel is pushed against the spring-loaded wheel clamping bracket, thereby releasing the wheel from the fixed wheel clamping bracket, and is, then, pulled upwardly from the wheel receptacle.

13 Claims, 9 Drawing Sheets

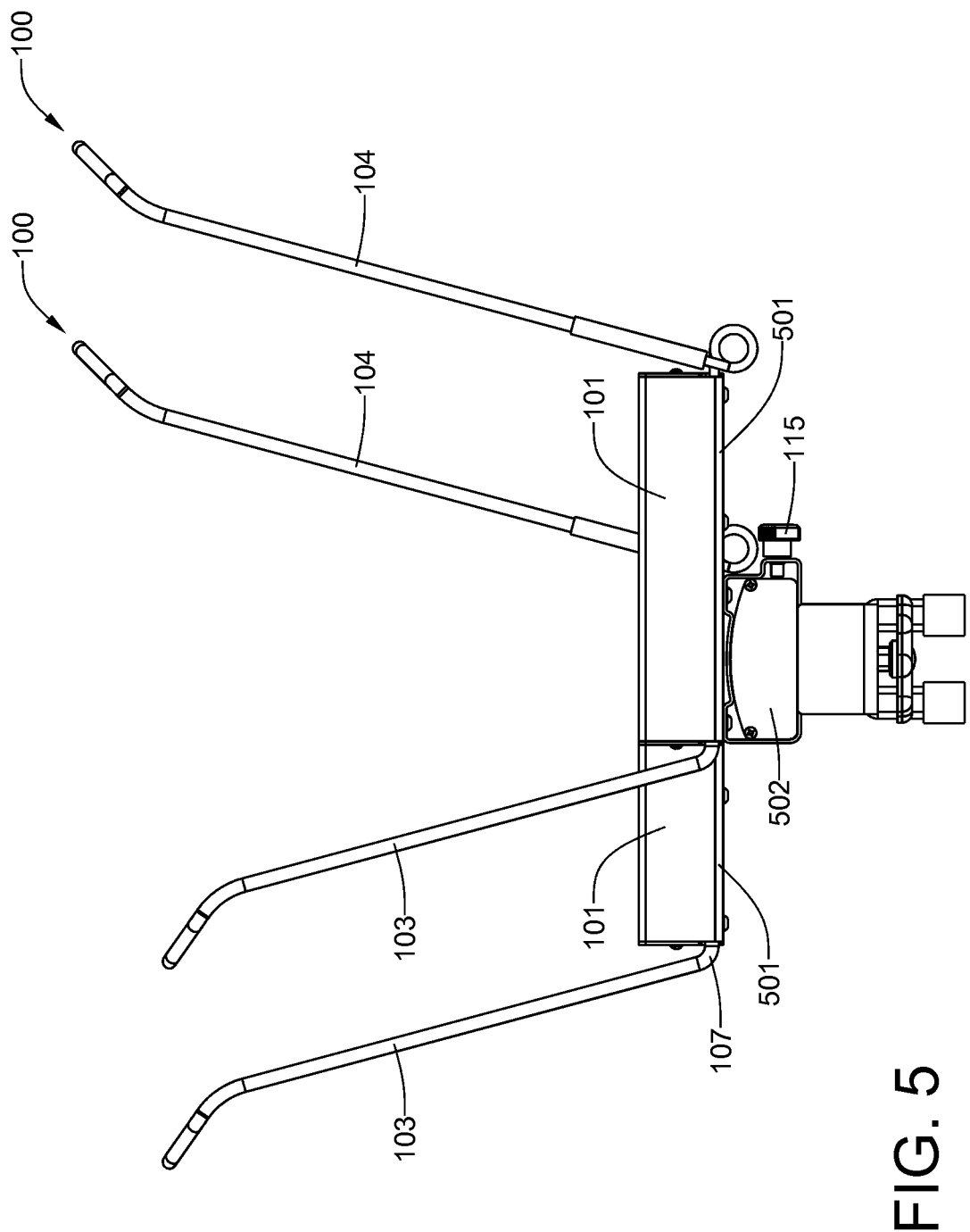

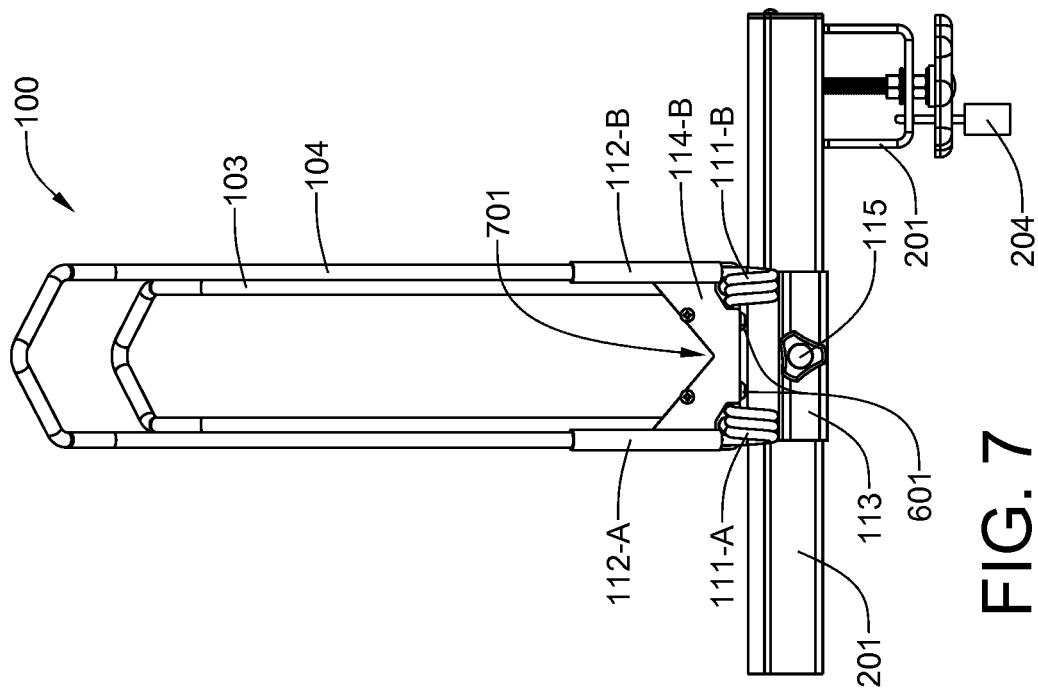
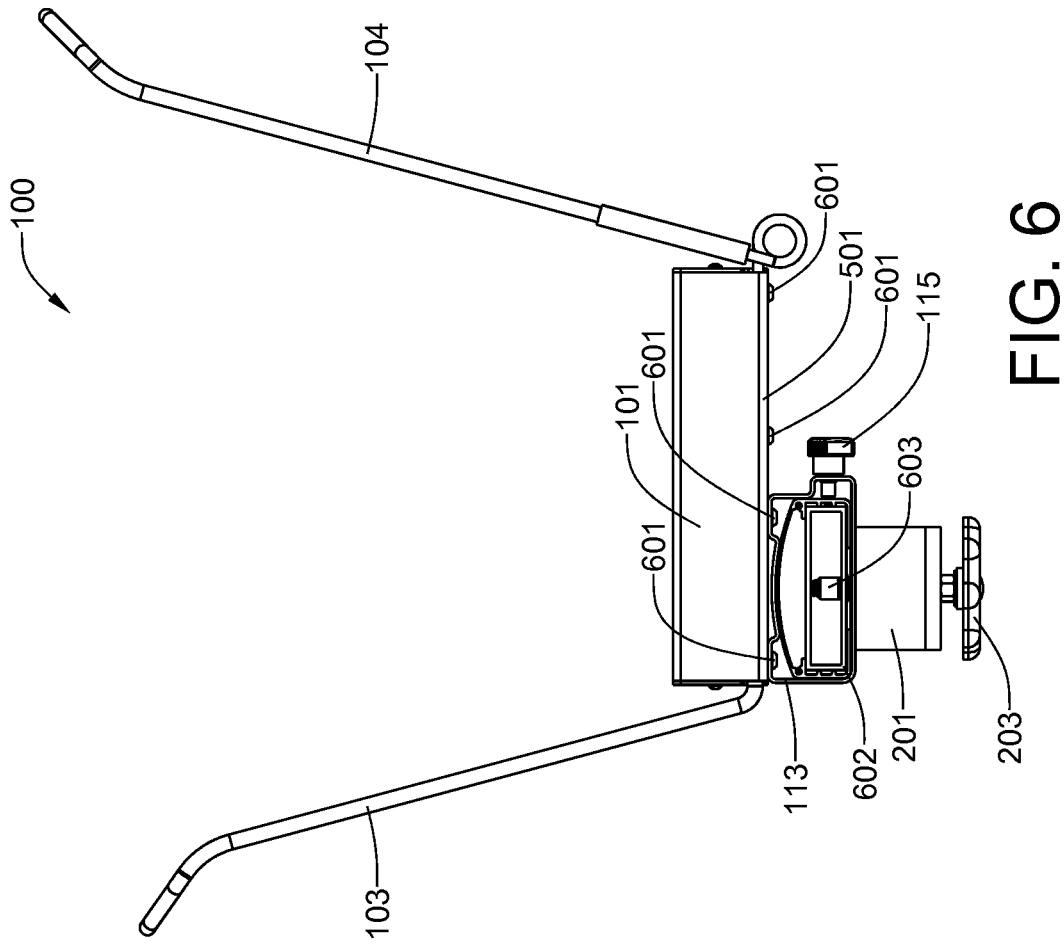

BICYCLE RACK INSTALLABLE IN A PICKUP TRUCK BED OR TRAILER

CROSS-REFERENCE TO RELATED APPLICATIONS

This application is a continuation-in-part of application Ser. No. 14/031,037, filed 18 Sep. 2013, now U.S. Pat. No. 9,022,265 B2, which claims the benefit of U.S. Provisional Application No. 61/744,045, filed 18 Sep. 2012.

FIELD OF THE INVENTION

This invention relates, generally, to devices for securing and carrying bicycles and other wheeled devices to an automobile, pickup truck, or other vehicle for transport and, more particularly, to racks for securing and carrying bicycles within the bed of a pickup truck, trailer, or similar transporting vehicle.

BACKGROUND OF THE INVENTION

Bicycles, motorcycles, and other wheeled recreational equipment are commonly transported in or on vehicles such as automobiles, pickup trucks, and trailers. Numerous racks and tie-down devices have been devised to secure these recreational vehicles during transport. Almost all of the prior-art carrying devices require clamping, strapping, or partial disassembly of a bicycle or recreational vehicle before it is transported. When such prior-art carrying devices are employed, considerable time and effort is required to load and unload bicycles and other such equipment. Many prior-art carrying devices have not been designed to specifically accommodate installation within pickup truck beds, and those that have been so designed typically obstruct the load-carrying floor of the bed even when bicycles are not being transported. Other carrying and transport devices do not securely grip the bicycle, thereby risking damage to a bicycle's frame, components, and paint if it is ejected from the carrying device when bumps in the road are encountered.

What is needed is a simple rack that may be mounted within the bed of a pickup truck, trailer, or other transport vehicle in such a way that it minimizes obstruction of the load-carrying bed floor of the pickup truck or trailer. Such a rack will also provide a secure method of carrying bicycles, as well as small motorcycles and motor scooters having wheels of varying size.

SUMMARY OF THE INVENTION

The present invention answers the heretofore expressed need for an improved, simple rack that is designed to carry bicycles, motor scooters and small motorcycles in the bed of a pickup truck or trailer with minimal obstruction of the load-carrying bed floor. The improved rack provides for secure transport of bicycles, motor scooters and small motorcycles without clamping, strapping, or disassembly of the cycle. Individual wheel receptacles having both fixed and spring-loaded wheel clamping brackets, are secured to a beam that transversely spans the bed of a pickup truck or trailer and is secured to the bed rails on opposite sides of the truck or trailer bed. In order to secure a bicycle or small motorcycle to the rack, a front or rear wheel of the cycle is lifted up and pushed into the wheel receptacle between the fixed and spring-loaded wheel clamping brackets. In order to unload the cycle, the wheel is pushed against the spring-loaded wheel clamping bracket, thereby releasing the wheel from the fixed wheel clamping bracket, and is, then, pulled upwardly from the wheel receptacle. The unique design of the wheel receptacle has many advantages over other racks designed for installation within the bed of a pickup truck. Specifically, the design of the wheel receptacle accommodates various wheel diameters and wheel widths without adjustments, disassembly, or changes being made to either the rack or cycle. The design is so effective at retaining the retained wheel that the wheel will not come out of the wheel holder even on very rough roads or terrain. In fact, the wheel cannot be released by only pulling up on the wheel. The fixed and spring-loaded wheel clamping brackets grip the tire of the carried cycle even tighter with the application of more upward pressure. Only by, first, releasing the spring-loaded wheel clamping bracket can the wheel be released from the wheel holder. Another important feature of the cycle rack is the adjustability of the clamping brackets which secure the bed-spanning beam to the bed rails. The adjustability enables the rack to be used on beds of different widths.

BRIEF DESCRIPTION OF THE DRAWINGS

FIG. 5 is a side elevational view of the five-wheel receptacle version of the bicycle rack of FIG. 2, showing the staggered mounting of the spring-loaded wheel receptacles;

FIG. 6 is a side elevational view of a single spring-loaded wheel receptacle mounted in a forward position on the bed-spanning beam;

FIG. 7 is a front elevational view of a single spring-loaded wheel receptacle mounted on the bed-spanning beam;

PREFERRED EMBODIMENT OF THE INVENTION

The improved bicycle rack installable in a pickup truck bed or trailer will now be described in detail with reference to drawing FIGS. 1 to 10. It should be understood that the drawings are not necessarily drawn to scale and intended to be merely illustrative of the invention.

Figure 1:
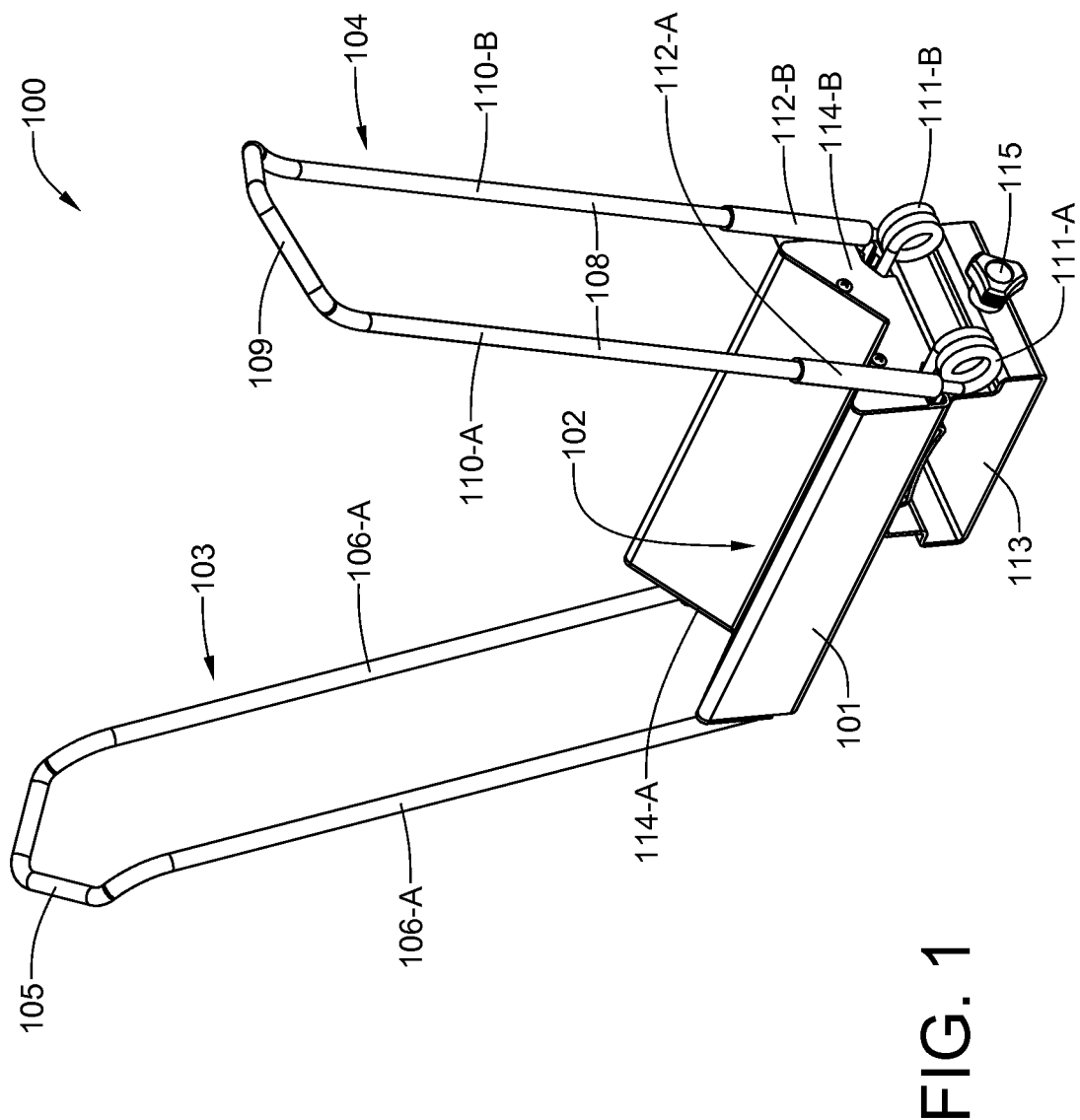
FIG. 1 is an isometric view of a spring-loaded wheel receptacle with the spring-loaded wheel clamping bracket in the foreground.

Referring now to FIG. 1, a single-wheel receptacle 100 has a base 101 on which a tire-shod front bicycle wheel rests. The base 101 has a V-shaped channel 102, which makes angled contact with both sides of the bottom portion of a tire resting in the channel 102. An upwardly-angled fixed wheel clamping bracket 103 is rigidly affixed to a first end of the base 101 and an upwardly-angled spring-loaded clamping bracket 104 is affixed to a second end of the base 101. The fixed wheel clamping bracket 103, which is designed to have minimal flex and to resist permanent deformation under normal use, is formed from a single rod that has been bent in a generally inverted U shape so that it incorporates a first V-shaped tire clamp 105 at a distal end thereof (i.e., at what would be the bottom of the U). The first V-shaped clamp 105 is coupled to the base 101 with a pair of generally parallel arms 106-A and 106-B (i.e., the sides of the U-shaped rod), each of which is rigidly attached to the first end of the base 101. For this embodiment of the invention, each of the parallel arms 106-A and 106-B has a sharply-angled bend 107 and 107 (please refer to FIG. 6, where only the bend 107 on parallel arm 106-A is visible), respectively, just before the arm is horizontally secured to the base 101. The spring-loaded wheel clamping bracket 104, on the other hand, is formed from a generally inverted-U-shaped, rigid, bent-rod portion 108 that incorporates a second V-shaped clamp 109 (i.e., at what would be the bottom of the U) that is continuous with a pair of generally parallel straight arms 110-A and 110-B (i.e., the sides of the U). Each of the arms is rigidly secured to one end of one of two coiled torsion springs 111-A and 111-B. The other end of each torsion spring 111-A and 111-B is rigidly affixed to the base 101. For this particular embodiment of the invention, the torsion springs 111-A and 111-B are secured to the bent rod portion 108 of the spring-loaded clamping bracket 104 with sleeves 112-A and 112-B. Each of the sleeves 112-A and 112-B can be either crimped or brazed to the bent rod portion 108 and its associated coiled torsion spring 111-A or 111-B. The base 105, which for this embodiment of the invention is a linear section of an aluminum extrusion, is bolted to a mounting bracket 113. The base 101 is equipped with a pair of end cover plates 114-A and 114-B, which are attached with screws to the base 101 A hand-knob bolt 115 is threadably secured within the mounting bracket 113.

Figure 2:
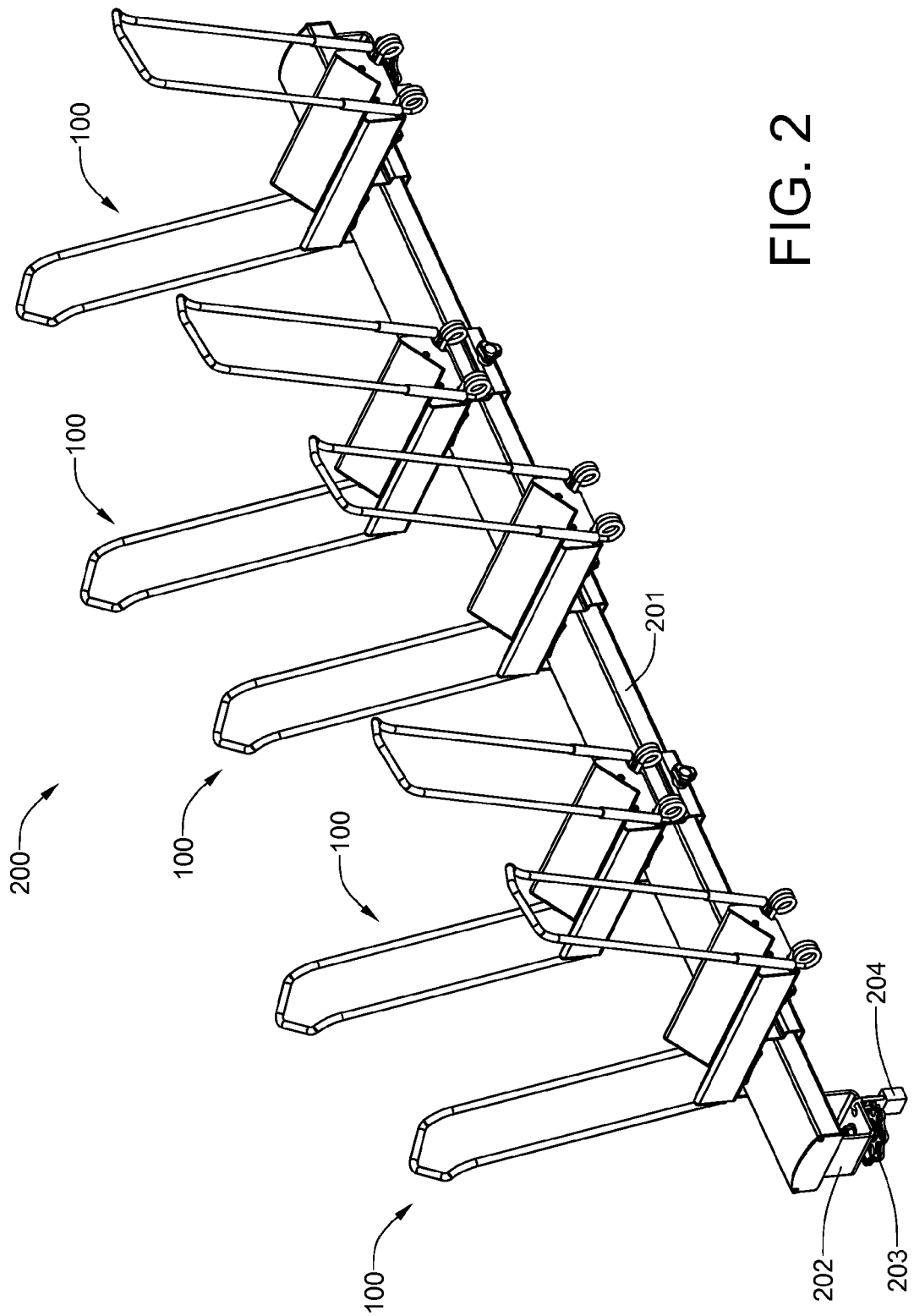
FIG. 2 is an isometric view of a five-wheel receptacle version of the bicycle rack.

Referring now to FIG. 2, a five-wheel receptacle bicycle rack 200 is equipped with five single wheel receptacles 100. Each mounting bracket 113 slides over a bed-spanning beam 201. The beam 201 is equipped with a clamping bracket 202 and a knob bolt 203 at each end. Each end of the beam 201 rests on one of the two bed rails 802 of a cargo bed of a pickup truck or open trailer. The bed rails 802 are the uppermost portions of opposed side walls of the bed. A clamping bracket 202 fits under each bed rail 802 and is clamped to the bed-spanning beam 201, thereby securing the beam 201 to the pickup truck bed. A lock 204 can be used to prevent unauthorized removal of the clamping brackets 202.

Figure 3:
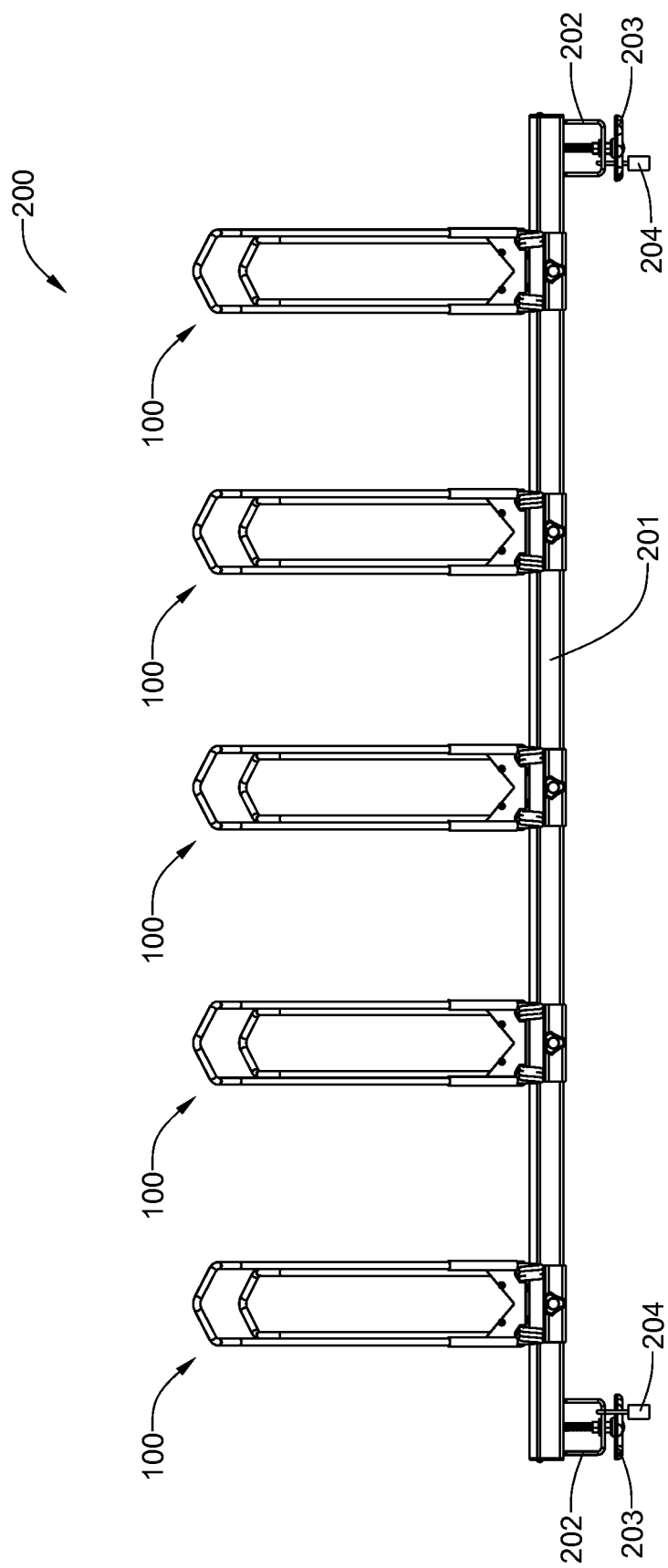
FIG. 3 is front elevational view of the five-wheel receptacle version of the bicycle rack of FIG. 2.

Referring now to FIG. 3, the bicycle rack 200 of FIG. 2 is shown in a frontal view. All of the components have been previously identified and described.

Figure 4:
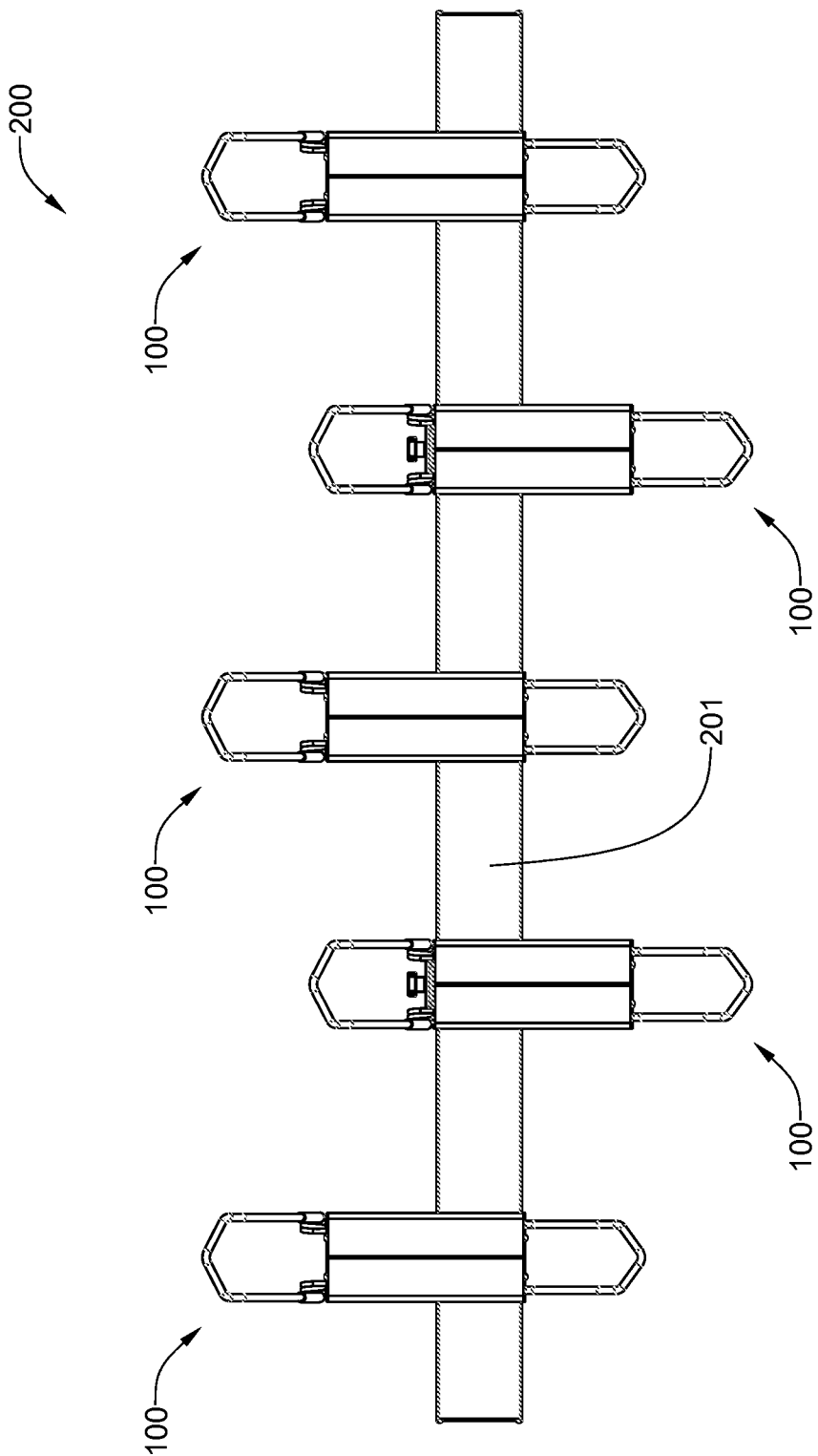
FIG. 4 is a top plan view of the five-wheel receptacle version of the bicycle rack of FIG. 2.

Referring now to FIG. 4, the bicycle rack 200 of FIG. 2 is shown in a top view. It will be noted that each wheel receptacle 100 is designed so that is can be installed in a fore or aft position on the bed-spanning beam 201.

Referring now to FIG. 5, the bicycle rack 200 of FIG. 2 is shown in an end view which more clearly shows the staggered mounting arrangement of the wheel receptacles 100. In addition, it can be seen how the fixed wheel clamping bracket 103 and the spring-loaded wheel clamping bracket 104 are clamped between a bottom plate 501 and the base 101. It will be further noted that an end plate 502 covers each end of the bed-spanning beam 201.

Referring now to FIG. 6, only one wheel receptacle 109 is shown mounted in a forward position on the bed-spanning beam 201. Eight screws 601, in two rows of four screws per row, provide the clamping force between the bottom plate 501 and the extruded base 105. It should be evident that as the spring-loaded clamping bracket 104 is pushed down, the coiled torsion springs 111-A and 111-B store energy that is only partially released when the spring-loaded wheel clamping bracket 104 is released against the tire of a wheel that is retained in the single-wheel receptacle 100. In order to unload the cycle, the wheel is pushed against the spring-loaded wheel clamping bracket 104, thereby releasing the wheel from the fixed wheel clamping bracket 103. The wheel is then pulled upwardly from the wheel receptacle 100. The unique design of the wheel receptacle 100 has many advantages over other racks designed for installation within the bed of a pickup truck. The design is so effective at retaining a retained wheel that the wheel will not come out of the wheel holder 100 even on very rough roads or terrain. In fact, the wheel cannot be released by only pulling up on the wheel. The fixed and spring-loaded wheel clamping brackets grip the tire of the carried cycle even tighter with the application of more upward pressure. Only by, first, releasing the spring-loaded wheel clamping bracket 104 can the wheel be released from the wheel holder 100.

Still referring to FIG. 6, a nut carrier 602 having a captured nut 603 is slidable within the bed-spanning beam 201. The knob bolt 203 engages the captured nut 603.

Referring now to FIG. 7, one wheel receptacle 100 is shown mounted on the left end of the bed-spanning beam 201. It will be noted that the V-shaped cross section of the extruded base 105 provides a V-shaped channel 701 that locates the front wheel of a carried bicycle such that the rotational axis of the wheel is generally parallel to the rotational axes of the rear wheels of the pickup or the wheels of a trailer in which the bicycle rack is installed. The V-shaped channel 701 is compatible with the diameters and widths of most tires used on adult bicycles, from narrow racing tires to large-cross-section balloon tires.

Figure 8:
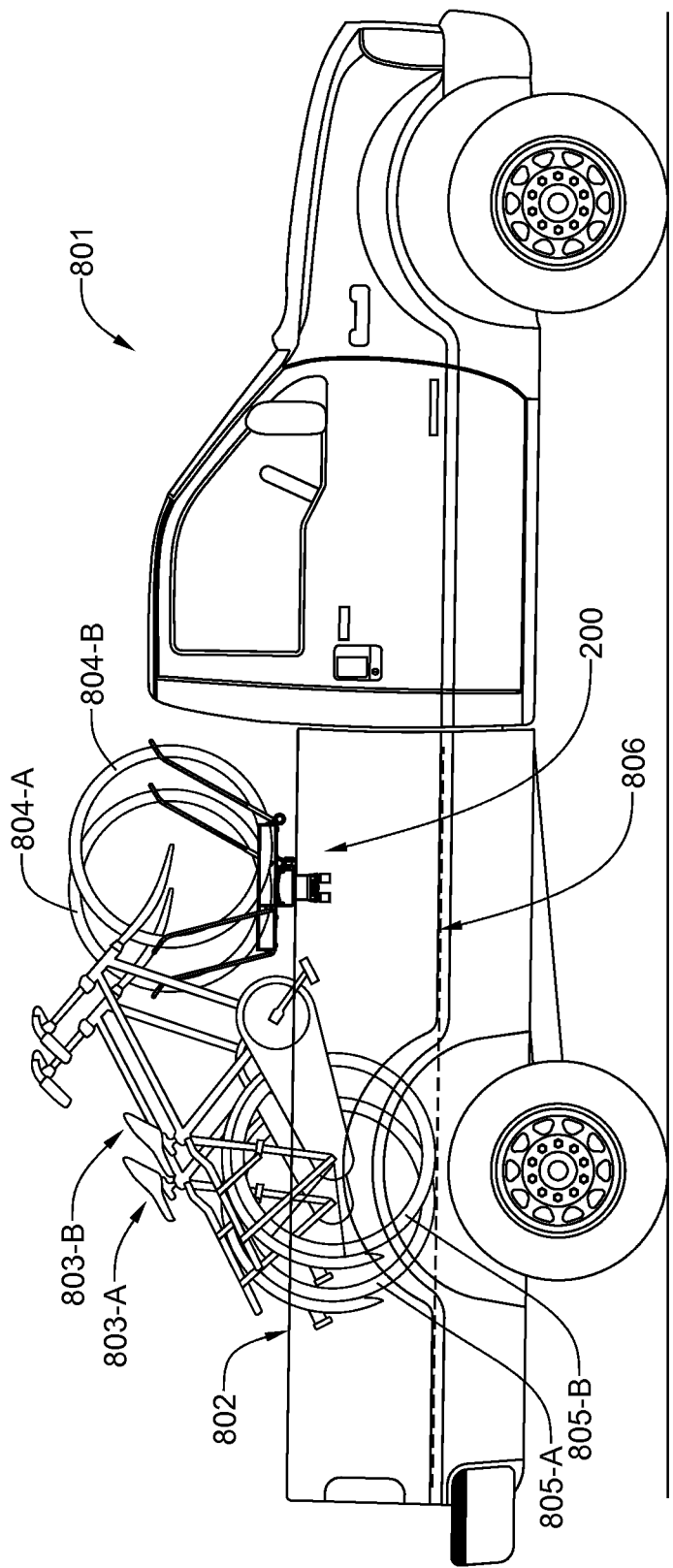
FIG. 8 is a side elevational view of a pickup truck having a bicycle rack according to one embodiment of the present invention installed in a forward position on the bed rails and having a pair of bicycles clamped in a staggered arrangement in the bicycle rack, with the rear wheel resting on the floor of the bed.

FIG. 8 is a side elevational view of a pickup truck 801 having a bicycle rack 200 installed in a forward position on the pickup truck bed rails 802 and having a pair of bicycles 803-A and 803-B clamped in a staggered arrangement in the bicycle rack, with the rear wheels resting on the floor of the bed.

Figure 9:
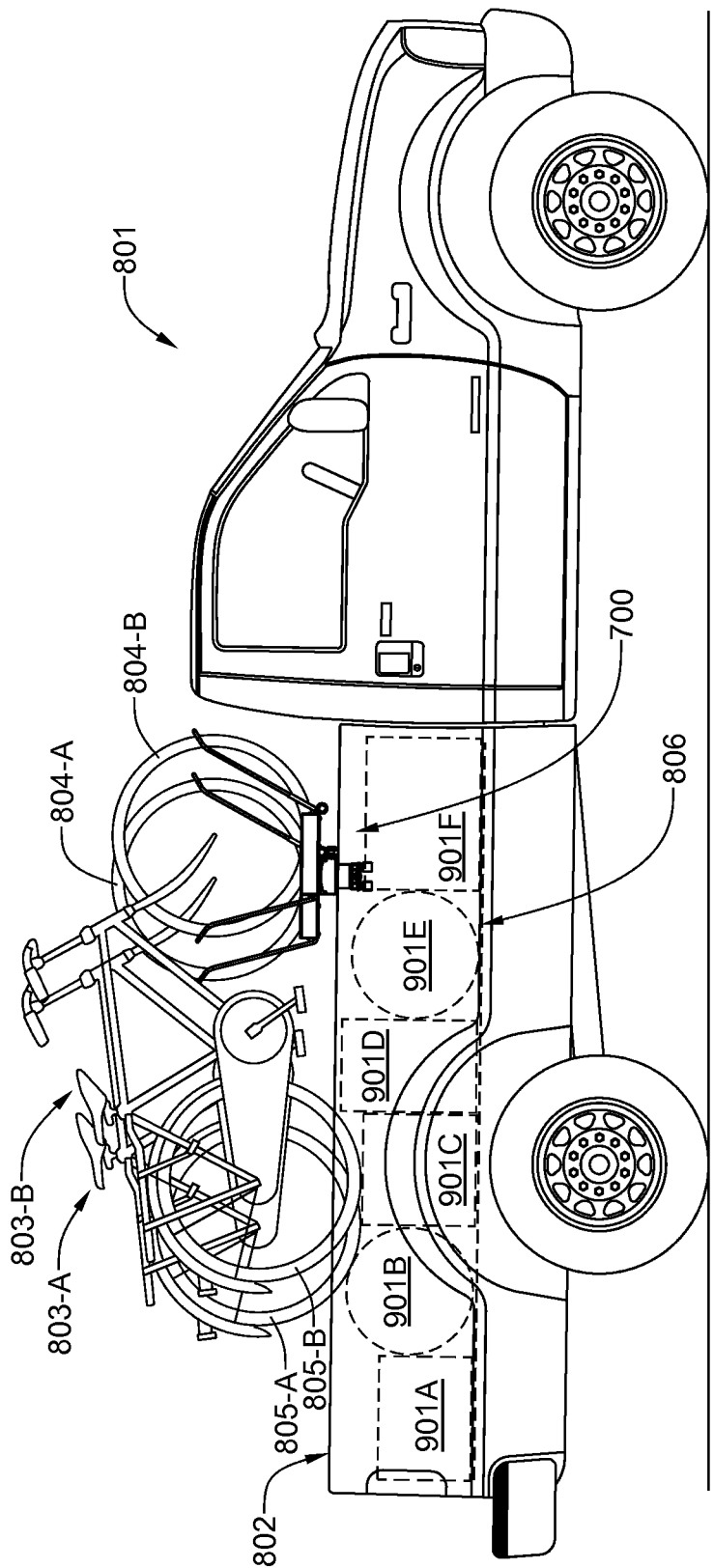
FIG. 9 is a side elevational view of a pickup truck having a bicycle rack according to one embodiment of the present invention installed in a forward position on the bed rails, having the bed loaded with gear, and with a pair of bicycles clamped in a staggered arrangement in the bicycle rack, with the rear wheels resting on top of the loaded gear.

FIG. 9 is a side elevational view of a pickup truck 801 having a bicycle rack 200 installed in a forward position on the bed rails 802, having the bed loaded with gear 901A, 901B, 901C, 901D, 901E and 901F, and with a pair of bicycles 803-A and 903-B clamped in a staggered arrangement in the bicycle rack, with the rear wheels resting on top of the loaded gear.

Figure 10:
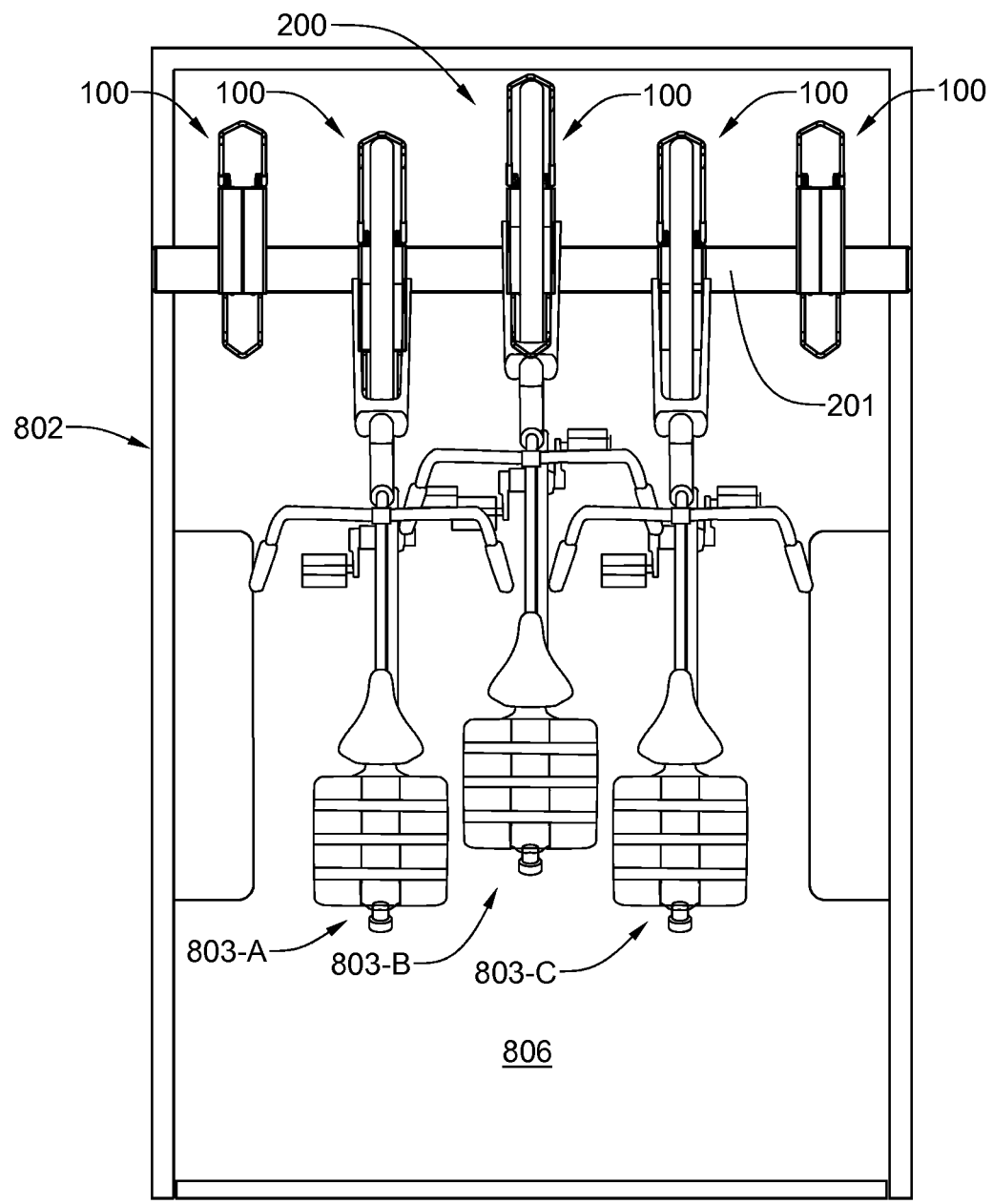
FIG. 10 is a top plan view of a pickup truck bed having the five-wheel receptacle version of the bicycle rack of FIG. 2 in which three bicycles are clamped therein in a staggered arrangement and ready for transport.

FIG. 10 is a top plan view of a pickup truck bed having the five-wheel receptacle version of the bicycle rack of FIG. 2 in which three bicycles 803-A, 803-B and 803-C are clamped therein in a staggered arrangement and ready for transport.

Although only a single embodiment of the improved cycle rack has been shown and described, it will be obvious to those having ordinary skill in the art that changes and modifications may be made thereto without departing from the scope and the spirit of the invention as are hereinafter claimed.

What is claimed is:

1. A bicycle transport rack securable to upper rail portions of opposed side walls of a cargo bed, said rack comprising:
   at least one bed-spanning beam securable between said opposed upper rail portions; and
   at least one wheel receptacle having a base securable to said bed-spanning beam, said base having an upwardly-facing V-shaped channel which makes angled contact with both sides of a bottom portion of a tire-shod bicycle wheel inserted in the channel so that the bicycle wheel is oriented generally parallel to the side walls of the cargo bed;

an upwardly-angled, fixed first wheel clamping bracket having a proximate end thereof rigidly affixed to said base at a first end of said V-shaped channel, said first wheel clamping bracket having a first V-shaped tire clamp at a distal end thereof which grips the tire of an inserted wheel on its circumference at a first distance from said base; and an upwardly-angled, spring-loaded second wheel clamping bracket affixed at its proximate end to said base member at a second end of said V-shaped channel, said second wheel clamping bracket having a second V-shaped tire clamp at a distal end thereof which grips the tire of an inserted wheel on its circumference at a second distance from said base and at a third distance from said first V-shaped clamp.

2. The bicycle transport rack of claim 1, wherein a cycle wheel secured by said V-channel bracket and said first and second wheel clamping brackets cannot be removed from said at least one wheel receptacle without, first, moving said second wheel clamping bracket away from said first wheel clamping bracket.

3. The bicycle transport rack of claim 1, wherein said first wheel clamping bracket is a generally inverted-U-shaped rod having a V-shaped portion that replaces what would be the curved portion of the U and serves as the first V-shaped tire clamp at the distal end thereof, said U-shaped rod also having a pair of generally parallel straight portions, which are analogous to the sides of the U, each of which is continuous with the V-shaped portion, each of said straight portions ending with a bend where it attaches to the base.

4. The bicycle transport rack of claim 1, wherein said fixed first wheel clamping bracket and said second spring-loaded wheel clamping bracket are clamped between the base and a bottom plate with multiple threaded fasteners that secure the bottom plate to the base.

5. The bicycle transport rack of claim 1, wherein said second wheel clamping bracket is a composite structure formed from:

a generally inverted-U-shaped rod having a V-shaped portion that replaces what would be the curved portion of the U and serves as the second V-shaped tire clamp at the distal end thereof, said U-shaped rod also having first and second generally parallel straight portions;

first and second coiled torsion springs; and first and second sleeves, said first sleeve coupling a free end of said first straight portion to a first end of said first coiled torsion spring, and said second sleeve coupling a free end of said second straight portion to a first end of said second coiled torsion spring; and wherein a second end of each coiled torsion spring is rigidly attached to the base.

6. The bicycle transport rack of claim 5, wherein said bent ends of said first wheel clamping bracket and said second ends of each coiled torsion spring are clamped between the base and a bottom plate with multiple threaded fasteners that secure the bottom plate to the base.

7. The bicycle transport rack of claim 1, wherein said bed-spanning beam is an aluminum extrusion.

8. The bicycle transport rack of claim 7, wherein a clamping bracket, one side of which fits beneath the upper rail portions, is used, in combination with a bolt securable to a captured nut in a nut carrier, which slides within the extruded beam, is used to secure each end of the bed-spanning beam to one of the rails.

9. A bicycle transport rack securable to upper rail portions of opposed side walls of a pickup truck cargo bed, said rack comprising:

at least one bed-spanning beam securable between said opposed upper rail portions; and at least one wheel receptacle having a base securable to said bed-spanning beam, said base having an upwardly-facing V-shaped channel which makes angled contact with both sides of a bottom portion of a tire-shod bicycle wheel inserted in the channel so that the bicycle wheel is oriented generally parallel to the side walls of the cargo bed;

an upwardly-angled, fixed first wheel clamping bracket having a proximate end thereof rigidly affixed to said base at a first end of said V-shaped channel, said first wheel clamping bracket having a first V-shaped tire clamp at a distal end thereof which grips the tire of an inserted wheel on its circumference at a first distance from said base; and an upwardly-angled, spring-loaded second wheel clamping bracket affixed at its proximate end to said base member at a second end of said V-shaped channel, said second wheel clamping bracket having a generally inverted-U-shaped rod with a V-shaped what would be a curved portion of the U and serves as a second V-shaped tire clamp at the distal end thereof, said U-shaped rod also having first and second generally parallel straight portions with proximate ends; and first and second coiled torsion springs, each torsion spring having a first end that is coextensive with a proximate end of one straight portion and a second end that is rigidly attached to the base;

wherein said second V-shaped tire clamp grips the tire of an inserted wheel on its circumference at a second distance from said base and at a third distance from said first V-shaped clamp.

10. The bicycle transport rack of claim 9, wherein a cycle wheel secured by said V-channel bracket and said first and second wheel clamping brackets cannot be removed from said at least one wheel receptacle without, first, moving said second wheel clamping bracket away from said first wheel clamping bracket.

11. The bicycle transport rack of claim 9, wherein said fixed first wheel clamping bracket and said second spring-loaded wheel clamping bracket are clamped between the base and a bottom plate with multiple threaded fasteners that secure the bottom plate to the base.

12. The bicycle transport rack of claim 9, wherein said bed-spanning beam is an aluminum extrusion.

13. The bicycle transport rack of claim 12, wherein a clamping bracket, one side of which fits beneath the upper rail portions, is used, in combination with a bolt securable to a captured nut in a nut carrier, which slides within the extruded beam, is used to secure each end of the bed-spanning beam to one of the rails.

* * * * *